United States Patent [19]

Naranjo

[11] 4,177,359
[45] Dec. 4, 1979

[54] POST WIRE GUIDE LATCHING MEANS
[75] Inventor: George Naranjo, Chicago, Ill.
[73] Assignee: Illinois Tool Works Inc., Chicago, Ill.
[21] Appl. No.: 953,337
[22] Filed: Oct. 20, 1978
[51] Int. Cl.[2] .............................................. H02G 1/00
[52] U.S. Cl. .................................. 179/98; 174/72 A; 361/428
[58] Field of Search .................... 179/98, 91 R, 91 A, 179/1 PC; 174/43–45, 65 R, 72 A, 72 R, 100; 248/68 R; 361/427, 428

[56] References Cited

U.S. PATENT DOCUMENTS

| | | | |
|---|---|---|---|
| 3,173,987 | 3/1965 | Potruch | 174/60 |
| 3,573,373 | 4/1971 | Mullin | 179/98 |
| 3,906,146 | 9/1975 | Taylor | 361/428 |
| 3,944,176 | 3/1976 | Danko | 174/72 A |
| 3,944,719 | 3/1976 | Rubey | 361/428 |
| 4,046,957 | 9/1977 | Taylor et al. | 174/72 A |

OTHER PUBLICATIONS

Western Electric Technical Digest No. 32, Oct. 1973, pp. 7–8, "Quick-Attachable Hook-Shaped Cable Bracket," D. W. Balls et al.

Primary Examiner—Gerald Brigance
Attorney, Agent, or Firm—Jack R. Halvorsen; Robert W. Beart

[57] ABSTRACT

A latching device for snap engagement with the apertured head of a post wire guide of the type used in communication terminal block installation. The latching device is capable of rotary swinging movement relative to its supporting posts so that a cantilever portion can be moved into overlying relation relative to an adjacent post thereby closing the throat formed by the two posts and serving as a retaining means for wires threaded between the adjacent posts.

10 Claims, 7 Drawing Figures

U.S. Patent     Dec. 4, 1979     4,177,359
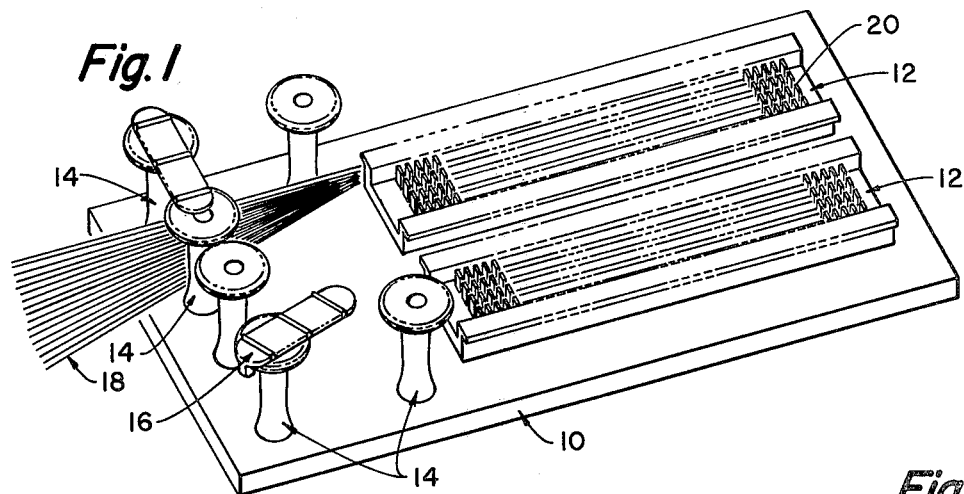
Fig. 1
Fig. 2
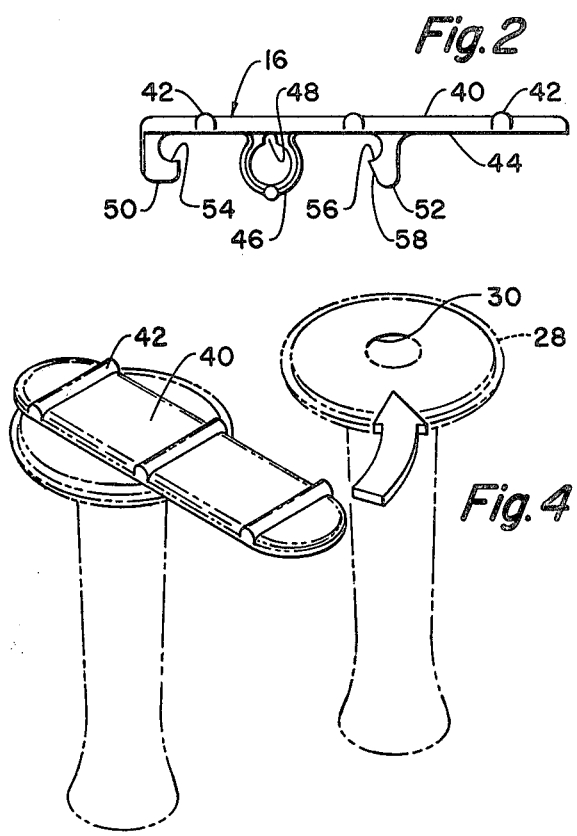
Fig. 3
Fig. 4
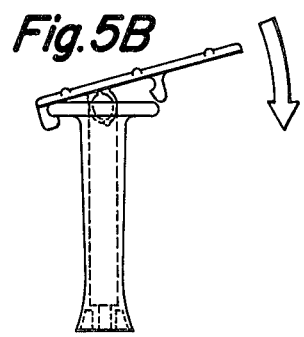
Fig. 5A    Fig. 5B
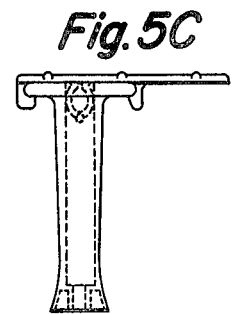
Fig. 5C

POST WIRE GUIDE LATCHING MEANS

BACKGROUND OF INVENTION

In the telephonic communication systems it is quite common to feed external cables to a central site. At such a central location the wires are routed to terminal blocks from which individual wires lead to individual key units. The terminal blocks and post wire guides are arranged on a supporting panel to provide an organized, orderly array of wires and blocks. Such an arrangement is shown in U.S. Pat. No. 3,573,373 issued in the name of Francis J. Mullin et al on Apr. 6, 1971. The supporting panels are generally positioned in a vertical arrangement for easy access by the installers. One of the difficulties experienced in such an arrangement is that in the presence of large numbers of wires and cables there is a tendency for them to be ejected from their original position between pairs of adjacent post wire guides.

BRIEF SUMMARY OF INVENTION

The present invention relates to a latching device for snap engagement with the apertured head of a post wire guide. The prior art shown in U.S. Pat. No. 3,573,373, mentioned herein above, were of a solid cylindrical body having a single aperture at the bottom for acceptance of a screw introduced from the backside of the supporting panel. Since that time it has been found desirable to provide a through bore which extends not only through the cylindrical body portion but also opens through the wafer-like head at the upper extremity of the guide wire posts.

It is an object of the present invention to provide a snap engaging latching means for mounting on the cylindrical wafer-like head of a post wire guide which can be moved in a rotative, swinging fashion relative to its supportive post to overlie in cantilever fashion an adjacent post thereby retaining in captured fashion wires which are threaded between adjacent posts.

Another object of the invention is to provide a simple economically fabricated member which can be readily installed and operated.

A further object of the invention is to provide a device which will obviate the problems mentioned here and above and reduce the necessity of call-back of installers.

BRIEF DESCRIPTION OF DRAWINGS

FIG. 1 is a perspective view of a preferred embodiment of the present invention as shown in mounted relation on a post wire guide and used in cooperation with adjacent post wire guides for retaining wires in a terminal block array;

FIG. 2 is a side elevational view of the preferred embodiment of the present invention;

FIG. 3 is a prespective view of the bottom side of the present invention as applied to a post wire guide shown for purposes of clarity in phantom;

FIG. 4 is a perspective view showing the operation of the guide relative to two adjacent guide wire posts; and FIG. 5a, 5b, 5c, show the three steps of assembly of the latching device of the type contemplated by the present invention to a guide wire post.

BRIEF DESCRIPTION OF INVENTION

Referring now to the drawings wherein similar parts are designated by similar numerals, in FIG. 1 there is shown a mounting board or support 10 carrying terminal blocks 12, a plurality of wire guide posts 14 and the latching means 16 which is the subject matter of the present invention. In FIG. 1 the support panel 10 is shown in a generally horizontal position, for purposes of illustration, however, in normal operation the support panel can be and the parts arrayed thereon would be disposed in a vertical position. The cable wire 18, as shown in the drawing, are lead in between a pair of adjacent post wire guides 14 and thence to the terminal block where they are then connected to the rows of terminals 20 with secondary wires being also attached for connection to the individual key units.

It previously has been experienced that when the bundle of wires 18 become too large in number, as well as due to the fact that the support panel 10 is normally in a vertical position, that the wires 18 will pop out between the post wire guides. The present invention relating to a latching means is designed to overcome these problems.

The post wire guides are a stock item in the telephonic communication industry and the post 14, shown in phantom in FIGS. 3 and 4 for purposes of clarity in illustration of the present invention, include an elongated hollow body 22 generally frusto-conical in outside configuration flared at its lower end to form a second frusto-conical section 24 forming the base of the body 22. The lower portion 24 includes a pass through hub or bore 26 accepting a fastener for mounting the post on the support panel 10. At the opposite extremity the post 14 is provided with a circular wafer-like head 28 having a centrally disposed aperture 30 that communicates with the internal bore 32 extending through the body portion 22. Where lead wires or cables are brought into alignment with the support panel 10, the post 14 are generally disposed in adjacent pairs as shown at the left hand end of FIG. 1.

The latching means 14 contemplated by the present invention, as best seen in FIGS. 2 through 5, includes a planar body portion 40 having a plurality of reinforcing ribs 42 disposed on the upper surface thereof and with a substantially planar under surface 44. Extending downwardly from surface 44 are means 46 spaced from one end of body 40 for positioning the latching means 14 relative to the central aperture 30 in head 28. In this embodiment the positioning means 46 is a closed resilient loop that is relieved as at 48 to provide resiliency to this closed loop, for purposes best set forth hereinafter. The loop 46 has a side-to-side dimension slightly in excess of the diameter of aperture 30 so that it will resiliently engage the side walls of bore 32 and yet permit swinging or lateral movement of the planar body 40 relative to the head 28. Extending downwardly from surface 44 are a pair of elements 50 and 52 which are spaced apart a distance substantially equal to the diametral extent of head 28. Element 50 in the present embodiment is a generally rigid element having an undercut shoulder 54 spaced from the surface 44 a distance substantially equal to the thickness of head 28. On the opposite side of loop 46 the element 52 includes a resilient arm having an undercut shoulder 56 with the lower portion of the arm-like element 52 being tapered as at 58 to provide a cam-like surface for engagement with the head 28.

The latching means 14 is applied to a post wire guide in the steps shown in FIGS. 5a, 5b and 5c. As best seen in FIG. 5a, the semi-rigid arm 50 with its shoulder 54 is latched over one edge of the head 28 and then the latching means 14 is swung downwardly in the direction of the arrow shown in FIG. 5b. As will be appreciated the circular resilient element 46 compresses into a generally elliptical shape until such time as the resilient arm 52 is cammed over the opposite diametral edge of the head 28 and seated as shown in FIG. 5b. Such an arrangement prevents inadvertent removal of the device from the head of a post wire guide, however, it does permit a swinging motion about the axis of the aperture 30, as can be seen in FIG. 4. This permits an operator to secure a bundle of wires 18 within adjacent guide posts and yet to readily remove same merely by swinging the body 40 of latching means 14 in a direction opposite to the arrow shown in FIG. 4.

The latching means disclosed in the present invention can be fabricated from standard thermoplastic materials by injection molding techniques well known in the art.

I claim:

1. A post wire guide latching means adapted for use with a post wire guide, said post having an elongated tubular body for mounting on a support at one end of said body and terminating at the opposite end with a circumferentially disposed laterally extending flange means forming a head having a bore that extends longitudinally through said head into said body, said latching means including an elongated element for mounting on said head, said element including means for positioning said element relative to said bore and means for engaging the free edge of said flange whereby said element can be rotated relative to said head to overlie the head of an adjacently positioned post to thereby capture wires guided and positioned between said posts.

2. A latching means of the type claimed in claim 1 wherein said elongated element is substantially planar.

3. A latching means of the type claimed in claim 2 wherein said positioning means is positioned adjacent to but spaced from one end of said element.

4. A latching means of the type claimed in claim 3 wherein said positioning means is a resilient member integral with said element and adapted to frictionally engage the bore in said head.

5. A latching means of the type claimed in claim 4 wherein said resilient member is a closed circle having an initial diameter greater than said hole and adapted to flex to a generally elliptical shape when forced into said bore.

6. A latching means of the type claimed in claim 3 wherein said engaging means includes at least one resilient shouldered arm, spaced from said positioning means and adapted to engage the outer edge of said head.

7. A latching means of the type claimed in claim 6 wherein said engaging means includes two resilient shouldered arms spaced on opposite sides of said positioning means a distance substantially equal to the diameter of said head.

8. A latching means of the type claimed in claim 7 wherein said engaging and positioning means are located adjacent one end of said element so that said element extends in cantilever fashion from said head.

9. A latching means and post wire guides of the type utilized to guide circuit wires to communication terminal blocks, including a plurality of post wire guides mounted in spaced relation on support means, each post including an elongated body fastened at one end to said support means, a circular head at the opposite end of said body and a through bore extending longitudinally through said head and body, said latching means including an elongated generally planar element adapted to be seated on said circular head, and to extend in cantilever fashion outwardly beyond the margins of said head, resilient positioning means adapted to frictionally engage said through bore and serve as the axis of rotation for movement of said element into overlying relation with an adjacent post to thereby capture wires guided between said posts, and at least one resilient engaging means for gripping the outer margin of said head to prevent inadvertent displacement of said planar element from mounted relation relative to said head.

10. A device of the type claimed in claim 9 wherein said positioning means includes a resilient member adapted to frictionally engage said through bore and a pair of resilient shouldered arms spaced equally on opposite sides of said positioning means a distance substantially equal to the diameter of said head, said engaging and positioning means being located adjacent one extremity of said elongated planar element.

* * * * *